Sept. 2, 1969    I. K. PORTEOUS    3,464,917
TREATMENT OF SEWAGE AND OTHER ORGANIC SLUDGES
Filed May 19, 1967    2 Sheets-Sheet 1
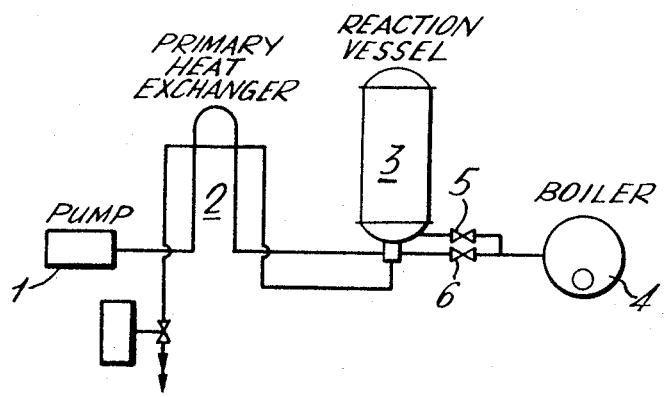
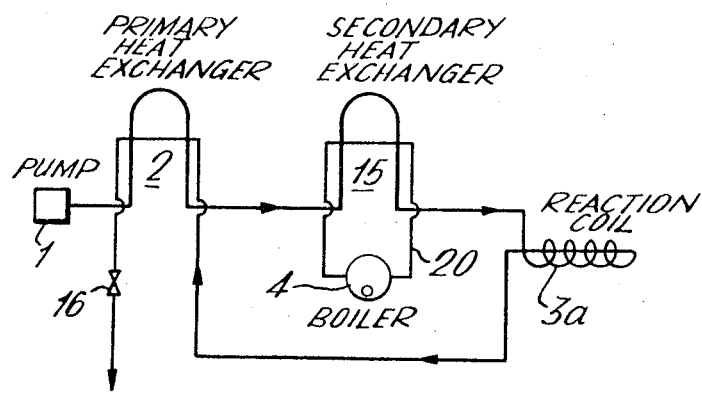
Inventor
Ian K. Porteous
Stevens, Davis, Miller & Mosher
Attorneys

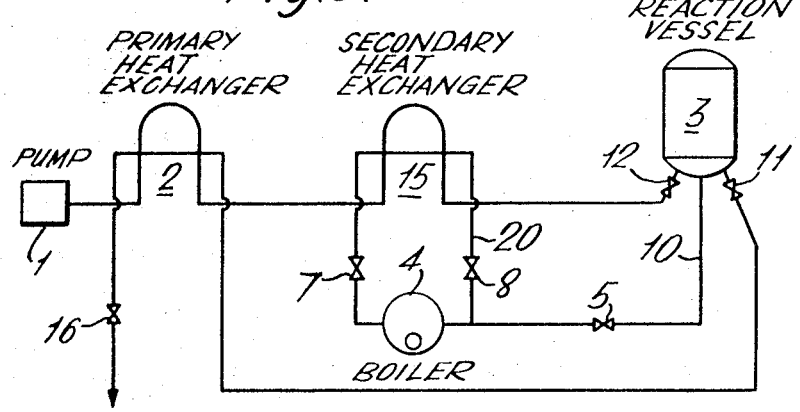
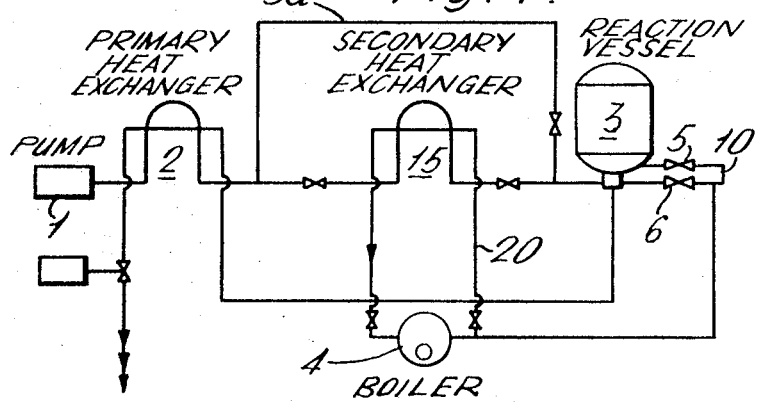
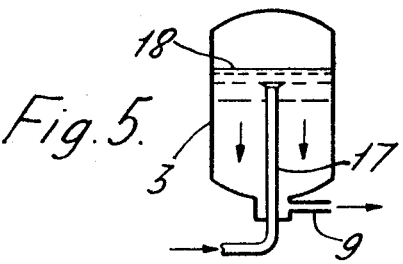

United States Patent Office 3,464,917
Patented Sept. 2, 1969

3,464,917
TREATMENT OF SEWAGE AND OTHER ORGANIC SLUDGES
Ian K. Porteous, London, England, assignor to Norstel and Templewood Hawksley Ltd., Slough, England
Filed May 19, 1967, Ser. No. 639,775
Claims priority, application Great Britain, May 24, 1966, 23,202/66
Int. Cl. C02c *1/00;* B01d *25/00*
U.S. Cl. 210—1                                8 Claims

ABSTRACT OF THE DISCLOSURE

A method for the treatment of organic sludge wherein the sludge is subjected to a conditioning treatment at an elevated temperature in a reaction vessel and wherein the treated sludge is subjected to heat exchange with incoming sludge. The method includes the preliminary step of introducing steam directly into the lower part of the reaction vessel so that the steam contacts and heats the sludge held therein.

---

This invention is concerned with the treatment of sewage and other organic sludges produced, for example, by sewage works, trade waste disposal plants and water works. In such treatment, the sludge is normally heated up and subjected to a conditioning treatment at an elevated temperature. After conditioning, the sludge is subjected to heat exchange with incoming sludge and then passed to settlement vessels, after which it is usually made into cake in filter presses or vacuum filters. Passage of sludge through the treatment plant is obtained by means of a pump and the necessary heat is supplied by steam from a boiler. Such treatment is hereinafter called sludge treatment of the kind referred to.

Plant for sludge treatment of the kind referred to may be stopped overnight or over a week-end and heat losses take place which must be made good before treatment can be recommenced. Heretofore, much unproductive time and heat has been required for the purpose of restarting the plant.

It is an object of the present invention to reduce the time required for starting the plant.

According to the present invention, there is provided a method of starting plant for sludge treatment of the kind referred to, which plant includes a reaction vessel for containing sludge during said conditioning treatment, said method comprising the steps of introducing steam into the lower part of said vessel so that it contacts and heats up sludge being held therein and, when the sludge in the vessel has been heated up, stopping said introduction of steam and proceeding with the treatment of the sludge.

In one known form of plant for sludge treatment, raw sludge is pumped through a heat exchanger and is then passed, mixed with steam from a boiler, into a reaction vessel. Means are provided for regulating the passage of the mixture through the vessel in order to condition the sludge. Sludge leaving the vessel is passed through said heat exchanger to pre-heat the raw sludge passing to the reaction vessel. Such plant is described in British patent specification No. 909,872. Hitherto it has been necessary to recirculate the whole of the contents of the plant until the operating temperature has been reached. According to the present invention, the necessity for recirculation may be avoided by providing a steam connection from the boiler direct into the bottom of the reaction vessel, this connection and a connection for supplying steam for admixture with entering sludge being provided with isolating valves.

In another known form of sludge treatment plant, untreated sludge is pre-heated by passage through a first heat exchanger, and then passed through a second heat exchanger where it is heated to the conditioning temperature by heat exchange with steam or hot water from a boiler. To maintain the sludge at the conditioning temperature for the necessary time, the sludge is then passed through one or more coils. The conditioned sludge then passes through the first heat exchanger. According to the present invention, the time necessary for starting such plant may be reduced by modifying the plant by replacing said coil or coils by at least one vessel having means for regulating the passage of sludge therethrough in order to condition the sludge and by providing a steam connection from the boiler direct into the bottom of said vessel, this connection and the connection between the boiler and said second heat exchanger having isolating valves. If desired connections may be provided for by-passing sludge round said second heat exchanger and for mixing steam with sludge passing into the vessel, isolating valves being provided in these connections. Thereby, the plant can be operated with direct or indirect steam heating as desired.

The following is a description, by way of example, of embodiments of the invention, reference being made to the accompanying schematic drawings, in which:

FIG. 1 shows one form of sludge treatment plant in accordance with the invention, FIG. 2 shows a known form of sludge treatment plant, FIG. 3 shows sludge treatment plant of the kind illustrated in FIG. 2 but modified in accordance with another form of the present invention, FIG. 4 shows another form of sludge treatment plant in accordance with the invention, and FIG. 5 shows a reaction vessel suitable for use in the plant of FIGS. 1, 3 and 4.

Referring to FIG. 1, untreated sludge is pumped by a pump 1 through a heat exchanger 2 and and then, via a steam circulator into a reaction vessel 3. At the same time, steam produced in a boiler 4 is also passed through the steam circulator and mixed with the sludge, and the mixed steam and sludge passes through an anti-short-circuiting device within the vessel 3 into the main body of the vessel. The anti-short-circuiting device may comprise a central tube 17 in the vessel 3 which terminates just below top water level 18. The mixture of sludge and steam rises up the tube 17 and the hot slurry then lies in a layer at the top of the mass of liquid. As this layer is replaced by subsequent layers, it will finally be forced out at the bottom of the vessel through pipe 9, having taken the required time to do so. The vessel may be provided with a suitable gas relief valve.

The arrangement as set out above is substantially as described in British patent specification No. 909,872. Hitherto, it has been necessary when starting up after a shut down to recirculate the whole of the contents of the apparatus until the operating temperature has been reached. In the illustrated embodiment of the present invention, the necessity for recirculation is avoided by providing a by-pass steam pipe 10 from the boiler 4 direct to the bottom of the body of the vessel 3 (i.e. by-passing the steam circulator and the tube 17). The by-pass pipe 10 has an isolating valve 5 and the steam feed pipe to the steam circulator has an isolating valve 6.

In starting up, the isolating valves 5 and 6 are both closed while steam pressure is raised in the boiler 4. When working pressure is reached, the valve 5 is opened and steam is admitted directly to the vessel 3. This steam admission continues until the required vessel temperature is reached, when some hot sludge is passed through the heat exchanger 2 to raise the temperature of the exchanger. When the operating temperature has been reached in both the vessel 3 and the heat exchanger 2, the valve 5 is closed and the valve 6 is opened. The pump 1 is started and the apparatus commences operation.

The apparatus of FIG. 1 has the following advantages:
(1) Starting up time is substantially reduced.
(2) The apparatus is more simple as provision for re-circulation is not necessary.
(3) Supervision is reduced. Operation can be automatic so that direct labour costs are reduced.
(4) Non-productive electrical consumption owing to pumping for re-circulation is eliminated.
(5) Owing to the reduced time required to raise temperatures, non-productive steaming time and radiation losses are reduced with resulting savings in fuel.
(6) Operation is simple and less skilled labour is necessary.

Referring to FIG. 2, untreated sludge is pumped by means of a pump 1 through a heat exchanger 2 which recovers heat from the treated sludge. The sludge then passes at an elevated temperature to a second or booster heat exchanger 15. Additional heat is provided from a steam or hot water boiler 4 through a pipe 20 to the heat exchanger 15 thus increasing the sludge temperature to the conditioning level. It is then required to maintain this temperature for a given period and this is commonly done by passing the sludge under treatment through a coil or series of coils 3a of such volumetric capacity that the treatment is completed. Sludge leaving the apparatus is controlled by a valve 16.

When applying this method to commercial installations it has been found that after the apparatus has been stopped overnight or over a weekend, heat losses take place and these have to be made good before the apparatus can be restarted. This procedure can take several hours consuming both unproductive time and heat.

In the embodiment of the present invention shown in FIG. 3, the retention coil 3a is replaced by a vessel or tank 3 which will be designed to operate at the pressure consistent with the temperature of conditioning. The vessel may be arranged to operate either vertically or horizontally. If necessary one or more such vessels may be used in series. This retention vessel, or vessels, is equipped with apparatus designed to eliminate possibility of short circuiting of the sludge which is passing through and which may be as shown in FIG. 5. An independent connection 10 is taken from the steam boiler 4 and led into the vessel 3 at the lowest practical point and this connection is provided with an isolating valve 5. The heating circuit connecting the boiler 4 and the heat exchanger 15 is also additionally provided with isolating valves 7 and 8.

Assuming the apparatus to be filled with sludge under treatment and below operating temperature and that the heating circuit is also filled, the procedure for starting up the apparatus is as follows:

The boiler 4 is first brought up to operating temperature and pressure with valves 5, 7 and 8 in the closed position. Isolating valves 11, 12 to the vessel 3 are also closed. When boiler temperature is reached the valve 5 is gradually opened to admit steam into the body of the vessel 3, by-passing the anti-short-circuiting device. When the required temperature in the vessel 3 is reached it will be found that due to condensation of steam the volume of sludge within the vessel will have increased thus creating a reserve of heated sludge which may be used to heat up the exchanger 2. Valves 7 and 8 may now be opened to admit heat to the exchanger 15 and the valve 11 may also be opened to admit heat to the exchanger 2. When the temperature of the exchanger 2 has reached the desired level the control valve 16 may be opened to reduce the sludge level in the vessel 3 to normal. The apparatus may then be started simply by closing the valve 5 and opening the valves 7, 8 and 12 and starting the pump 1.

The method has the advantages described in relation to FIG. 1 and, as also does the plant of FIG. 1, eliminates the possibility of incompletely processed sludge leaving the apparatus.

The use of a retention vessel is superior to the use of a retention coil, because:
(1) It will not block with extraneous material such as is frequently found in sewage sludge in particular.
(2) It is not subject to erosion as would be a coil where centrifugal action creates this hazard.
(3) It is flexible is operation allowing a greater or lesser amount of sludge to be treated per unit of time without structural alteration.
(4) It permits the use of the warming up method described above.
(5) The exposed surface is less for a given unit of volume and therefore radiation losses are reduced.

FIG. 4 shows an embodiment of the present invention in which the plant may be used for direct heating (as hereinbefore described with reference to FIG. 1) or for indirect heating (as hereinbefore described with reference to FIG. 3), as desired. In operation of the plant for indirect heating, sludge is pumped by a pump 1 through a heat exchanger 2 and via a booster exchanger 15 into a reaction vessel 3, while steam or hot water circulates in a closed circuit from a boiler 4 through the booster exchanger 15. Sludge from the vessel 3 passes back through the heat exchanger 2. The plant has a by-pass steam pipe 10 from the boiler 4 direct to the reaction vessel 3 with an isolating valve 5 for quick starting as described with reference to FIG. 3.

In operation of the plant for direct heating, sludge leaving the heat exchanger 2 by-passes the booster exchanger 15 through a pipe 5a and is admitted directly into a steam circulator on the reaction vessel 3. At the same time valves on the heating circuit isolate the booster exchanger 15 and pass steam directly to the steam circulator. As before, sludge leaving the vessel 3 passes directly through the exchanger 2. For quick starting an isolating valve 7 cuts off steam to the steam circulator while valve 5 is opened as hereinbefore described.

With the arrangement of FIG. 4, the advantages of direct or indirect heating are obtainable as desired.

If desired the flow through the anti-short-circuiting device shown in FIG. 5 may be reversed so that the sludge to be treated enters through the pipe 9 and the treated sludge leaves through the pipe 17.

I claim:
1. Plant for the treatment of organic sludge including a boiler, a reaction vessel, a primary heat exchanger and a secondary heat exchanger having sludge passageways connected in series and leading to the reaction vessel, said primary heat exchanger having a passageway for sludge leaving the reaction vessel in heat exchange relationship with its first-said sludge passageway and said secondary heat exchanger having a passageway in heat exchange relationship with its first-said sludge passageway and having an inlet and outlet, connections between said inlet and outlet and the boiler forming a closed circuit including the last said passageway in the secondary heat exchanger and the boiler, and a further direct connection between the boiler and the bottom of the reaction vessel to introduce steam directly into the reaction vessel.

2. Plant according to claim 1 also including a sludge by-pass round the secondary heat exchanger, a steam circulator on the reaction vessel connected to said by-pass and a connection between the boiler and the said circulator.

3. A method for the treatment of organic sludge wherein the sludge is subjected to a conditioning treatment at an elevated temperature in a reaction vessel and wherein the treated sludge is subjected to heat exchange with incoming sludge, the method including a preliminary step of introducing steam directly into the lower part of the reaction vessel so that the steam contacts and heats sludge held therein, and when the sludge in said reaction vessel has been heated up, stopping the introduction of steam and proceeding with the treatment of the sludge.

4. A method according to claim 3, in which after the introduction of steam into the lower part of the vessel has been stopped, steam is mixed with sludge externally of the reaction vessel and the mixture of sludge and steam introduced into the reaction vessel.

5. A method according to claim 3, in which after the introduction of steam into the lower part of the reaction vessel has been stopped, steam is used to heat, by way of indirect heat exchange, the sludge to be treated in the reaction vessel.

6. Plant for the treatment of organic sludge comprising a reaction vessel in which sludge to be treated is subjected to a conditioning treatment at an elevated temperature, a boiler for supplying steam for heating the sludge, a heat exchanger through which incoming and treated sludge is passed in order to transfer heat to the incoming sludge, a steam connection between the boiler and the lower part of the reaction vessel whereby steam can be introduced directly into the vessel to heat the sludge contained therein, and a second heat exchanger for preheating sludge to be treated in the reaction vessel, the second heat exchanger being heatable with steam from the boiler.

7. Plant according to claim 6, comprising means for mixing sludge with steam before it enters the reaction vessel.

8. Plant according to claim 6, comprising an anti-short-circuiting device for the sludge, mounted in the reaction vessel.

References Cited
UNITED STATES PATENTS

| | | | |
|---|---|---|---|
| 2,190,598 | 2/1940 | Fischer | 210—12 X |
| 2,075,224 | 3/1937 | Porteous | 210—71 X |
| 3,155,611 | 11/1964 | Porteous | 210—71 X |
| 3,219,579 | 11/1965 | Kranz | 210—71 X |
| 3,272,739 | 9/1966 | Earle et al. | 210—63 |
| 3,359,200 | 12/1967 | Gitchel et al. | 210—63 |
| 3,272,740 | 9/1966 | Gitchel et al. | 210—63 |

OTHER REFERENCES

Greene, R. A.: Sludge Heating Methods, Sewage Works Journal, November 1949, vol. 21, pp. 968–973.

MICHAEL E. ROGERS, Primary Examiner

U.S. Cl. X.R.

210—71, 181